United States Patent [19]
Izumi et al.

[11] Patent Number: 4,796,043
[45] Date of Patent: Jan. 3, 1989

[54] MULTI-POINT PHOTOMETRIC APPARATUS

[75] Inventors: Shuji Izumi, Sakai; Masaaki Nakai, Kawachinagano; Akihiko Fujino, Sakai; Toshio Yamaki, Osaka; Hiromu Mukai, Kawachinagano; Nobuyuki Taniguchi, Nishinomiya, all of Japan

[73] Assignee: Minolta Camera Kabushiki Kaisha, Osaka, Japan

[21] Appl. No.: 68,212

[22] Filed: Jan. 15, 1988

Related U.S. Application Data

[63] Continuation of Ser. No. 899,099, Aug. 22, 1986, abandoned, and a continuation of Ser. No. 068,722, Jun. 30, 1987, Pat. No. 4,745,427.

[30] Foreign Application Priority Data

| Sep. 13, 1985 | [JP] | Japan | 60-201651 |
| Sep. 13, 1985 | [JP] | Japan | 60-201652 |
| Sep. 13, 1985 | [JP] | Japan | 60-201653 |
| Sep. 13, 1985 | [JP] | Japan | 60-201654 |

[51] Int. Cl.$^4$ .............................................. G03B 7/091
[52] U.S. Cl. ..................................... 354/402; 354/432; 354/458; 354/465
[58] Field of Search ................. 354/402, 432, 458, 465

[56] References Cited

U.S. PATENT DOCUMENTS

| 4,306,787 | 12/1981 | Fukuhara eet al. | 354/432 |
| 4,309,091 | 1/1982 | Fukuhara et al. | 354/432 |
| 4,412,730 | 11/1983 | Saegusa et al. | 354/410 |
| 4,423,936 | 1/1984 | Johnson | 354/403 |
| 4,456,354 | 6/1984 | Mizokami | 354/414 |
| 4,476,383 | 10/1984 | Fukuhara et al. | 354/432 X |
| 4,514,073 | 4/1985 | Taniguchi et al. | 354/414 |
| 4,690,536 | 9/1987 | Nakai et al. | 354/402 |
| 4,693,581 | 9/1987 | Yamaki et al. | 354/400 |

FOREIGN PATENT DOCUMENTS

| 53-148638 | 11/1978 | Japan . |
| 57-662 | 1/1982 | Japan . |
| 57-88416 | 6/1982 | Japan . |

Primary Examiner—Michael L. Gellner
Attorney, Agent, or Firm—Burns, Doane, Swecker & Mathis

[57] ABSTRACT

A multi-point photometric apparatus for use in a camera or the like operative to measure the luminance of several divided areas in an objective field. Among the luminance signals produced by the photometric circuit for the several areas, a signal from one area which is used for automatic focus adjustment is designated as a reference value, and the maximum and minimum values of luminance signals and the differences of these from the reference value are evaluated. The reference value and differences in the form of digital data and information on the film latitude are processed with a microprocessor to calculate the exposure value. The exposure value is modified to an extent that the reference remains within the film latitude.

6 Claims, 13 Drawing Sheets

F I G. 4
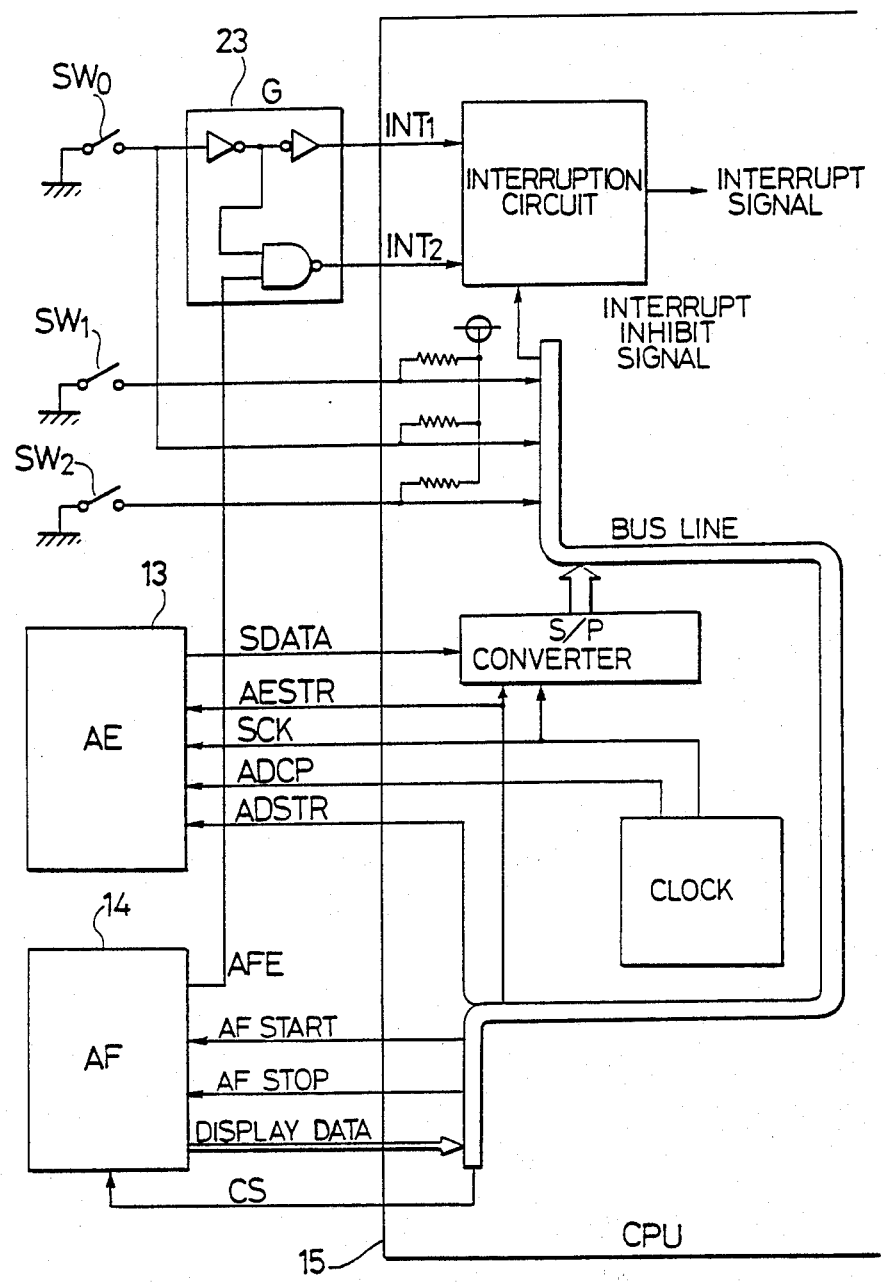

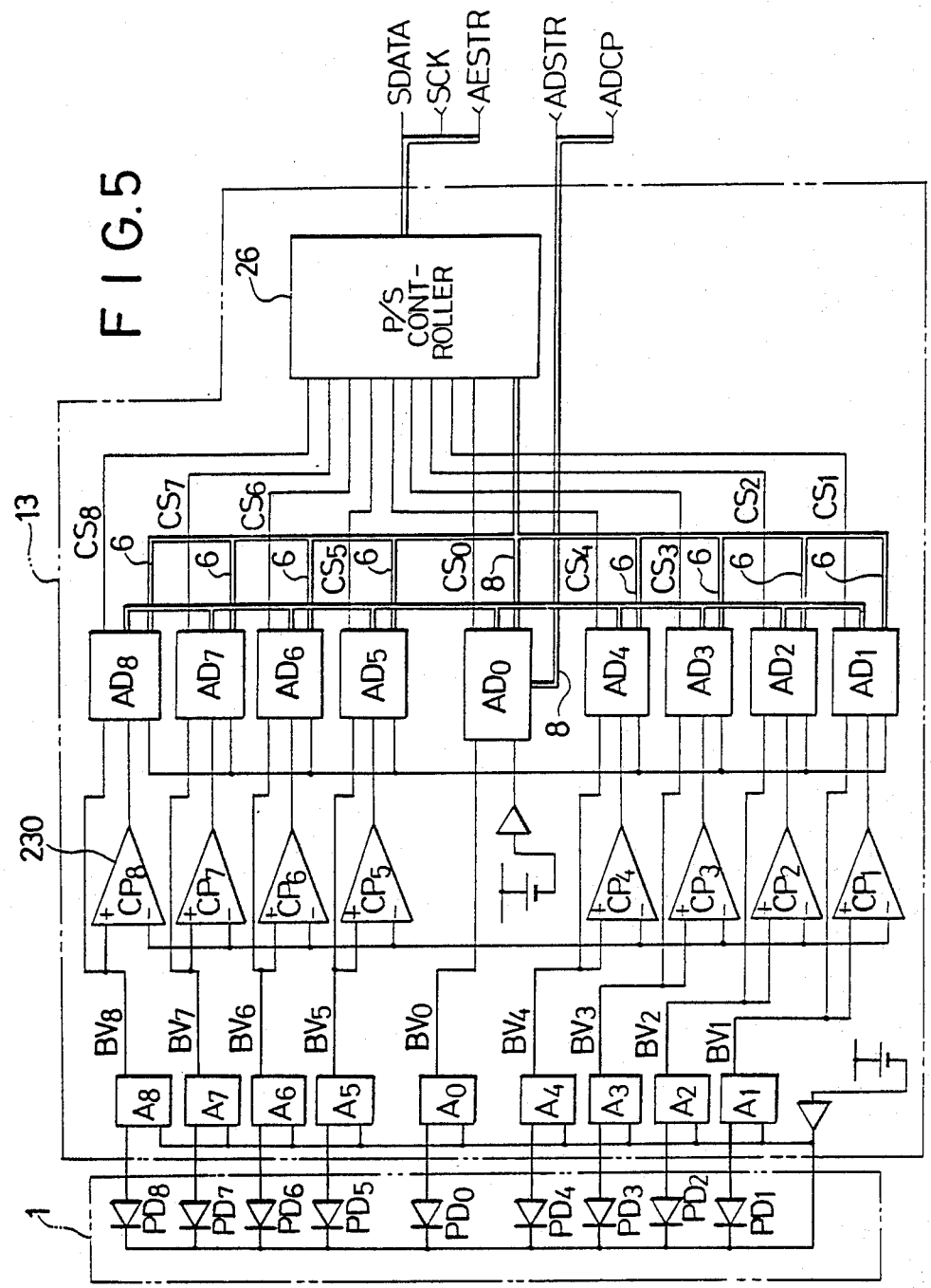

F I G. 11
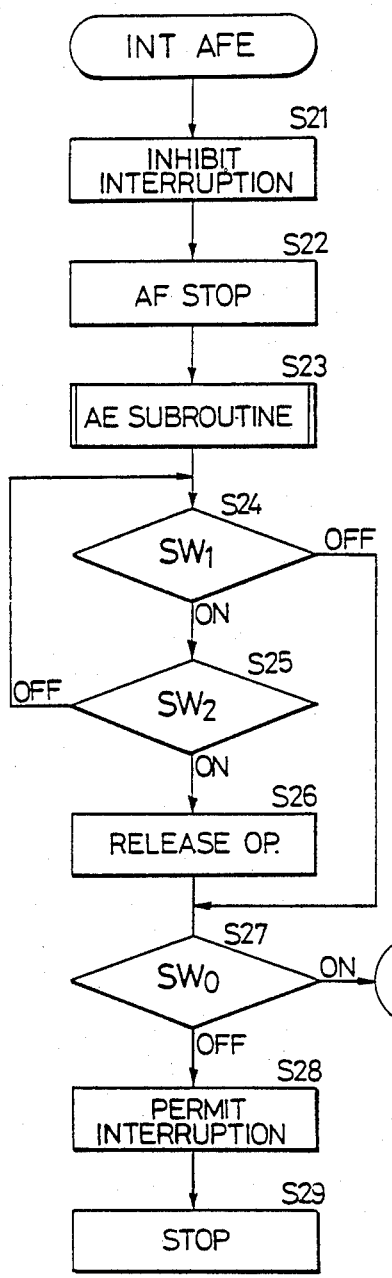
F I G. 12
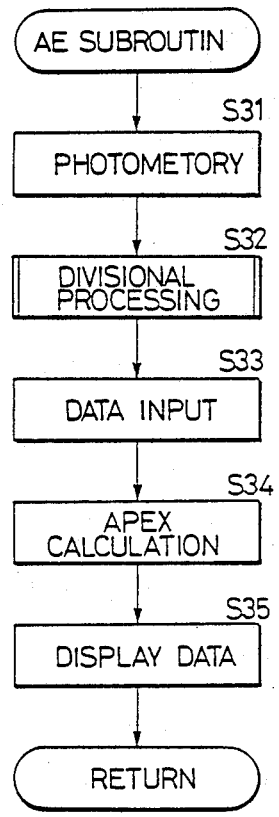

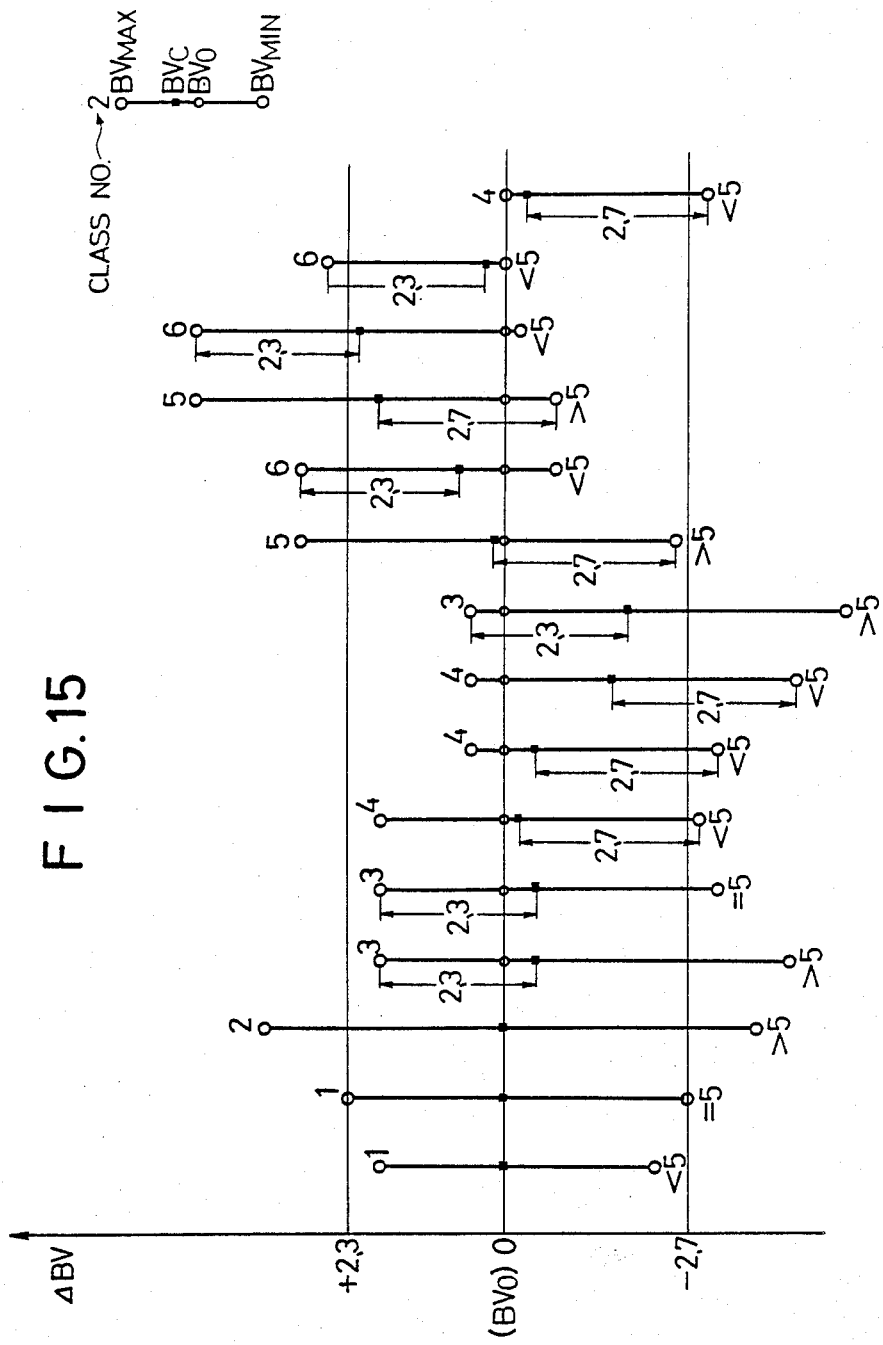

MULTI-POINT PHOTOMETRIC APPARATUS

This application is a continuation, of application Ser. No. 899,099, filed Aug. 22, 1986, now abandoned.

This application is also a continuation of application Ser. No. 068,722 filed on June 30, 1987 and entitled MULTI-POINT PHOTOMETRIC APPARATUS, now Pat. No. 4,745,427.

BACKGROUND OF THE INVENTION

1. Field of the Invention

The present invention relates to a photometric apparatus, for use in a camera or the like, operative to measure the luminance in several portions of an objective field and determine the expedient exposure value basing on the measured signals.

2. Description of the Prior Art

Various systems have been proposed as a means for determining the exposure value of a camera and the like by measuring the luminance in several portions of an objective field and setting the exposure value basing on the produced luminance signals. These include the system of determining the exposure value from the average value, mean value or most-frequency value of many luminance signals, the system of determining the exposure value from the maximum or minimum value of many luminance signals shifted by about half of the film latitude, and the system of determining the exposure value from the mean value of the maximum and minimum values of many luminance signals.

A photometric apparatus described in the U.S. Pat. No. 4,476,383 (corresponded to the Japanese Utility Model Publication No. 60-11475) is designed to operate in such a way that several luminance signals are produced for several divided areas in an objective field, an average value of the signals is evaluated, each luminance signal in each area is compared with the mean value so as to standardize the luminance in each divided area, and the exposure value is determined through the pattern analysis using the correlation between patterns and expedient exposure values based on the experiment and experience.

There have been proposed exposure value setting devices, as described in the U.S. Pat. No. 4,456,354 (corresponded to the Japanese Patent Laid-open No. 58-100839) and Japanese Patent Laid-Open Nos. 57-622, in which the spot luminance value in a central portion and an averaged luminance value in peripheral portions are measured to evaluate the brightness of an objective field, and a certain exposure compensation is applied when the difference between the central luminance and peripheral luminance is greater than a preset value.

The above-mentioned prior art photometric apparatus are intended to determine more optimal exposure value through the recognition of the luminance distribution in the entire object field, rather than the determination of the exposure value simply based on an averaged metering or spot metering. However, even in these apparatus, if there is a great difference in brightness between an object portion to be focused and other portions, an over-exposure or an under-exposure for the intended portion would result.

The above-mentioned prior art photometric apparatus implement analog-to-digital conversion of the sensor signals produced for the divided areas in an objective field for the digital calculation in determining the exposure value. Such an analog-to-digital conversion, however, inevitably takes a considerable time for processing the sensor signals. On this account, more quick signal processing has been desired in the photometric apparatus built in cameras or the like where quick, continuous shooting is a prerequisite.

SUMMARY OF THE INVENTION

It is an object of the present invention to provide an improved multi-point photometric apparatus for use in a camera or the like.

Another object of the present invention is to provide a camera capable of determining the expedient exposure value based on both the operator's intention and the luminance distribution of the whole objective field obtained by multi-point photometry.

Still another object of the present invention is to provide a camera equipped with a multi-point photometric apparatus which measures the luminance distribution of an objective field, and determines the exposure value with the automatic focus adjustment area in the objective field taken into the consideration.

A further object of the present invention is to provide a novel analog-to-digital signal conversion means capable of fast processing the luminance signals.

BRIEF DESCRIPTION OF THE DRAWINGS

FIG. 4 is a block diagram showing in more detail the principal portion in FIG. 1;

FIG. 5 is a block diagram of the photometric circuit;

FIGS. 10 through 14 are flowcharts of signal processing, FIG. 11 showing the process up to "release", FIG. 12 showing the subroutine of AE, FIG. 13 showing the subroutine of divisional process, FIG. 14 showing the subroutine for evaluating the maximum value of the luminance differences and other values in the divisional process; and FIG. 15 is a diagram showing examples of the process result for determining exposure of an objective field in accordance with the divisional processing.

DESCRIPTION OF THE PREFERRED EMBODIMENT

Figure 1:
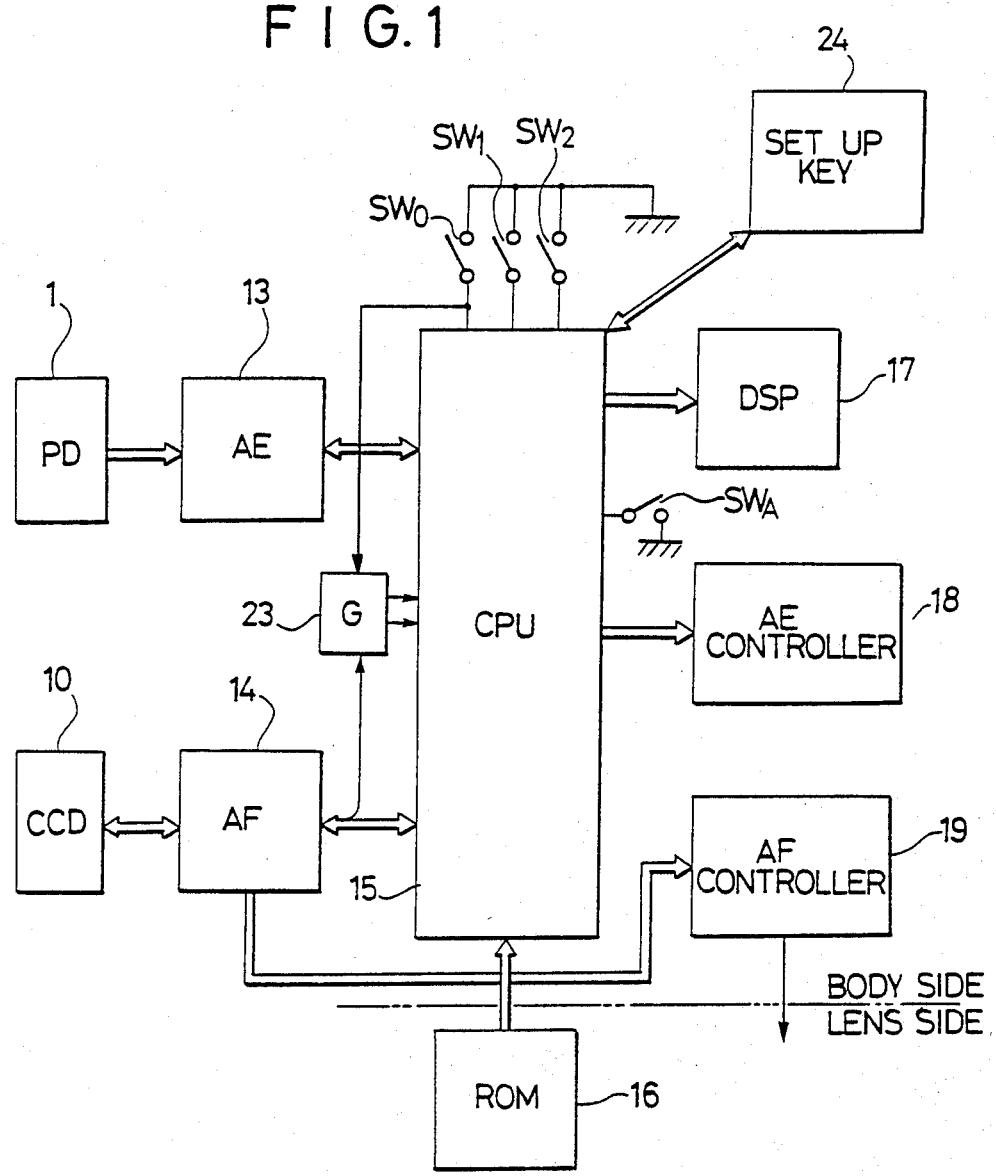
FIG. 1 is a block diagram showing in brief the automatic exposure and automatic focus control device of a camera which incorporates the inventive photometric apparatus.

The present invention will now be described in detail with reference to the drawings. FIG. 1 shows in block diagram the arrangement of the automatic exposure and automatic focus control device of a camera in which the inventive photometric apparatus is incorporated. The arrangement includes a set of photoelectric transducers 1 for measuring the luminance of incident lights from divided areas of an objective field, an automatic exposure control circuit (will be termed simply AE) 13 which processes and A/D converts output signals produced by the transducers 1, an automatic focus sensor 10, an automatic focus detection circuit (will be termed simply AF) 14 which processes the output signals produced by the sensor 10, a micro processor (will be termed CPU) 15 which processes the signals from the AE and other circuits to determine the exposure value and other values and also commands all control devices, a read-only memory (will be termed ROM) 16 storing the lens specific information such as the F-number and focal length of the lens, a signal processing circuit 17 which reads out to display the shooting condition and the like as a result of process by the CPU, an automatic exposure controller (will be termed simply AE controller) 18 which controls the exposing mechanism of the camera in response to the exposure signal provided by the CPU, an automatic focus controller (will be termed simply AF controller) 19 which controls the focus control mechanism of the camera in response to the focus control signal provided by the CPU, a set of switches $SW_0$, $SW_1$ and $SW_2$ controlled by single operating button or the like which sequentially closes the switch $SW_0$ for photometry, switch $SW_1$ for automatic focus and switch $SW_2$ for shutter release. Further provided are a gate circuit 23, and a setup key 24 which is used to preset the shooting conditions of the camera such as the exposure value. $SW_A$ is the photometry mode selector switch which is operated in the exterior of the camera and select the mode of the photometry. Detail of the selection will be described in later.

Figure 2:
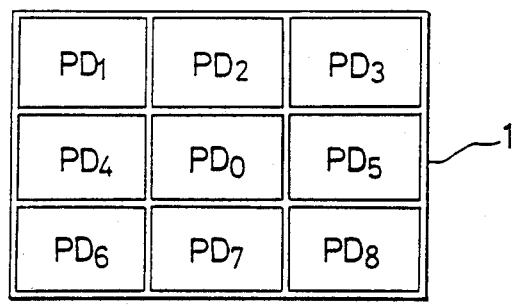
FIG. 2 is a diagram showing the arrangement of the photoelectric transducers.

FIG. 2 shows the array of photoelectric transducers 1, such as photodiodes each disposed in one of divided areas of the image plane, for measuring the luminance of the objective field and the luminance distribution in the field.

Figure 3:
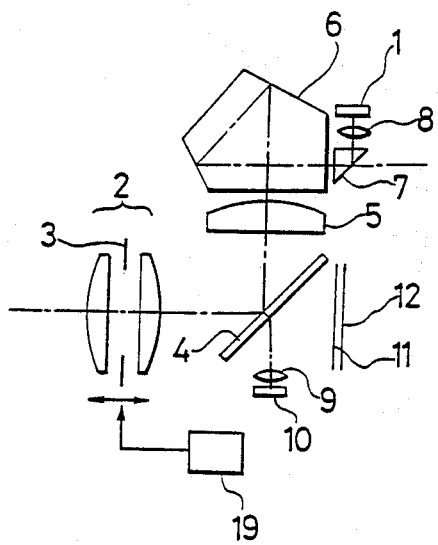
FIG. 3 is a simplified cross-sectional view showing the asembling of the inventive photometric apparatus in a camera.

FIG. 3 is a partial cross-sectional view of the optical system of the camera which incorporates the inventive photometric apparatus. In the figure, the light incident to the lens system 2 is reflected by the main mirror 4, conducted upward through the condenser lens 5 and pentagonal prism 6, further conducted through the half prism 7 and relay lens 8, and focused on the photoelectric transducer 1 disposed above. Part of the light going through the semitransparent portion in the center of the mirror 4 is reflected downward by the subsidiary mirror at the back of the mirror 4, conducted through the relay lens 9, and incident to the automatic focusing sensor 10. The sensor 10 is to detect the state of in-focus in the central portion of the view field corresponding to $PD_0$ shown in FIG. 2. Other components shown in FIG. 3 includes a diaphragm 3, a shutter curtain 11, a photograph film 12, and an automatic focus controller (AF) 19.

FIG. 4 shows in more detail the circuit arrangement between the operating switches, AE circuit and AF circuit and the CPU, shown briefly in FIG. 1. The operating switches close their individual contacts sequentially in response to the operation of the common operating button in the order of photometry switch $SW_0$, automatic focus switch $SW_1$ and release switch $SW_2$ as the operating button is depressed. Closing of the photometry switch $SW_0$ generates two interrupt signals INT1 and INT2, which are treated by the interrupt processing ciruit within the CPU. Further, interruption is inhibited by the CPU once $SW_0$ is closed and interruption occurs.

The automatic exposure control circuit 13 receives the A/D conversion start signal ADSTR, the A/D conversion clock pulse ADCP, the reference clock pulse SCK and the data read signal AESTR from the CPU, and sends the luminance information for the field as a result of process in the AE 13 to the CPU in the form of serial data. The luminance information signal sent from the AE is transformed into a parallel signal by the serial-to-parallel (S/P) converter within the CPU. The automatic focus detection circuit (AF) 14 receives the AF start signal, AF stop signal and chip-select signal CS used for data reading from the CPU, and sends the automatic focus detection end signal AFE to the gate circuit connected to the photometry switch $S_0$ and the display data to the CPU.

FIG. 5 shows the arrangement of the AE circuit which processes the signals from the photoelectric transducers, converts the signals into digital data, and sends it to the CPU. The following describes the circuit arrangement and its operation. The photoelectric transducers $PD_0$–$PD_8$ laid out in the divided areas of the image field have their individual outputs rendered logarithmic compression by the respective amplifiers $A_0$–$A_8$, with the result of respective luminance values $BV_0$–$BV_8$.

Among the luminance values $BV_0$–$BV_8$, the value $BV_0$ for the central area of the view field is used as a reference value to evaluate the differences of the remaining luminance values $BV_1$–$BV_8$ from the reference value $BV_0$ inclusive of the polarity of each signal, and the distribution of brightness in the whole view field with respect to the brightness in the central area is obtained. The analog luminance value $BV_0$ of the central area is converted by the A/D converter $AD_0$ into an 8-bit signal, while the other luminance values $BV_1$–$BV_8$ are compared with the reference value $BV_0$ by the respective comparators $CP_1$–$CP_8$ to obtain the result of comparison as polarity (sign) signals and at the same time difference values $BV_i$–$BV_0$ (i=1 to 8) are converted into 5-bit digital signals by the respective A/D converters $AD_1$–$AD_8$, and 6-bit signals each including 5-bit data and a sign bit are produced.

Figure 6:
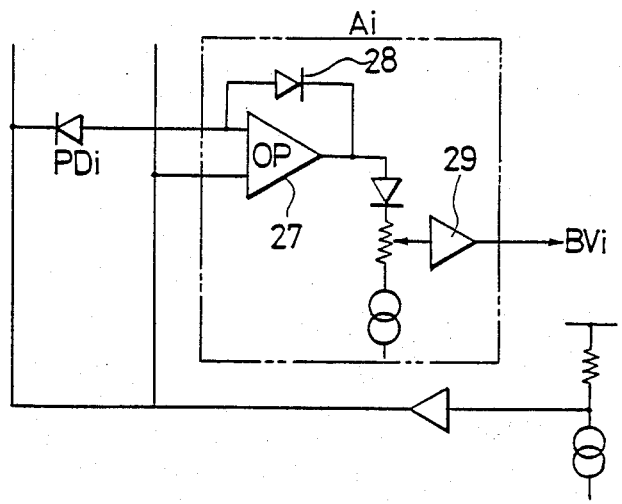
FIG. 6 is a schematic diagram showing an example of the logarithmic compression circuit.

Each A/D converter incorporates a latch register for holding the converted data, and one of the latches selected by the chip-select signals $CS_0$–$CS_8$ issued by the P/S controller has its contents received by the P/S controller 26 in the form of an 8-bit parallel signal. The P/S controller 26 converts the parallel signal into a serial signal, and sends it to the CPU. The details of the P/S controller will be described later using FIG. 9. The logarithmic compression amplifiers $A_0$–$A_8$ shown in FIG. 5 are each made up of an operational amplifier 27, a compressing diode 28 and a level shift buffer 29 as illustrated in FIG. 6.

Figure 7A:
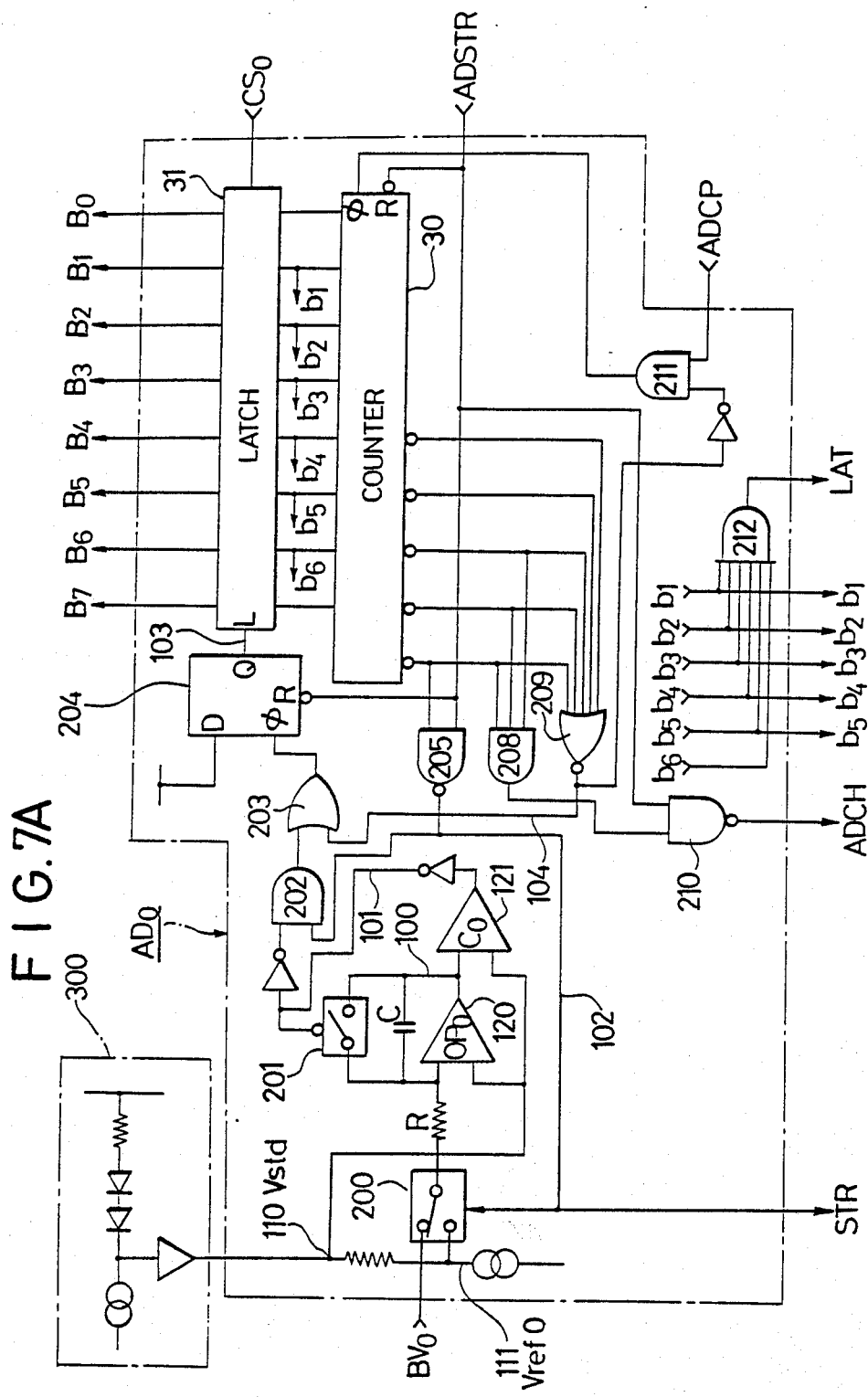
FIG. 7 is a set of block diagrams showing the A/D conversion circuit.
Figure 7B:
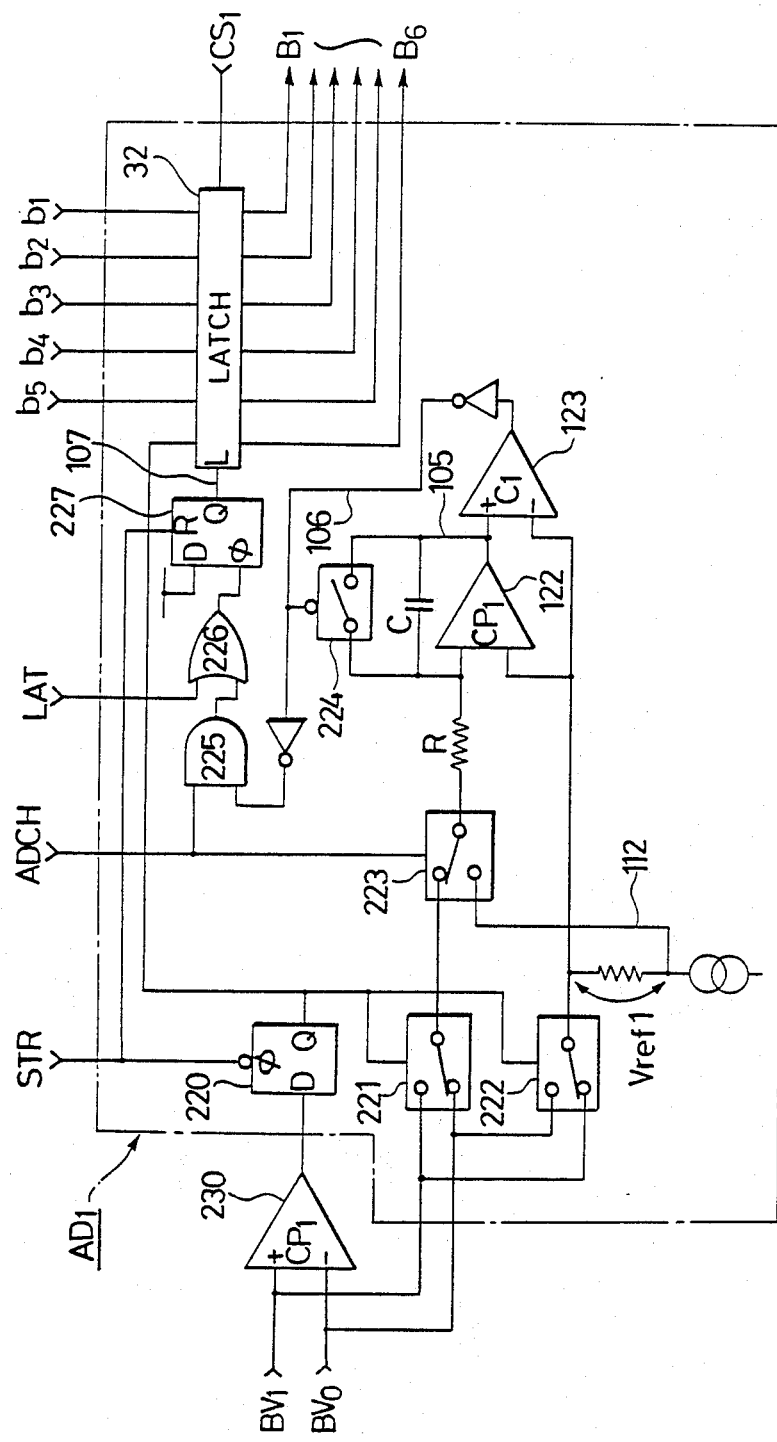

FIG. 7 shows the circuit arrangement of the A/D converters $AD_0$–$AD_8$, FIG. 7A showing the $AD_0$, while FIG. 7B showing $AD_1$ (same as $AD_2$–$AD_8$). Both types of A/D converters, $AD_0$ and $AD_1$–$AD_8$, are basically the same and employ the dual slope A-D conversion system. In operation, an input analog signal representing a luminance value is charged to an integrating capacitor for a certain time length. The charging current varies in magnitude depending on the luminance value, and charges stored in the capacitor represents the integrated luminance value. The capacitor is discharged in a constant current condition and the discharge time is measured using clock pulses, so that the luminance value is evaluated as a total number of pulses.

In the circuit of $AD_0$ shown in FIG. 7A, the input signal carrying the luminance value $BV_0$ is received at one input of the switching device 200. The power source circuit 300 produces two kinds of voltage levels $Vref_0$ and $Vstd$, the former $Vref_0$ being supplied to another input of the switching device 200, while the latter $Vstd$ being supplied to the first input of the operational amplifier 120. The switching device 200 has its output fed through a resistor R to the second input of the operational amplifier 120. Connected between the output and second input of the operational amplifier 120 is an integrating capacitor C, which is in parallel connection with another switching device 201. The operational amplifier 120 has its output fed to the first input of the comparator 121, whose second input is supplied with the reference voltage $Vstd$. The output of the comparator 121 is fed to the control input of the switching device 201 and via the gates 202 and 203 and flip-flop 204 to the control input L of the latch 31.

The A/D converter $AD_0$ is provided therein with a counter 30 for measuring the charging and discharging time lengths of the integrating capacitor C and a latch 31 for holding the counter result. The CPU supplies A/D converting clock pulses ADCP via the gate 211 to the input (count input) of the counter 30 and the A/D conversion start signal ADSTR to the R input (reset input) of the counter 30. Besides the use for the A/D conversion for the input luminance value $BV_0$, the counter 30 within the $AD_0$ is further used as A/D converting counters for the $AD_1-AD_8$ in dealing with the input luminance values $BV_1-BV_8$.

The circuit operation is as follows. Initially, it is assumed that the counter 30 is in a reset state and the input luminance value $BV_0$ is greater than the reference level $Vstd$. The gate 205 produces a low output. The gate 205 produces a high output when the counter 30 contains a value outside the range of hex 000 to hex 0FF (hex stands for hexadecimal). Namely, when the counter 30 is in a reset state and receives the ADSTR signal, the gate 205 produces a low output and the switching device 200 is set to the position as shown in FIG. 7A.

The input luminance value $BV_0$ is fed via the switching device 200 and resistor R to the operational amplifier 120, which produces the difference between that input and the reference level $Vstd$ provided as another input. The differential signal is received by the comparator 121 for comparison with its another input $Vstd$, and it is designed to produce a low output when the input $BV_0$ is larger than $Vstd$. The switching device 201 is in an open state as shown in FIG. 7A, causing the output voltage ($BV_0-Vstd$) from the operational amplifier 120 to be applied to the integrating capacitor C, and it starts charging by the current ($BV_0-Vstd$)/R.

The counter 30 receives the A/D conversion start signal ADSTR from the CPU and it starts counting A/D converting clock pulses ADCP sent via the gate 211. When the count has reached a certain value, indicative of the expiration of a certain time length, the counter 30 issues a signal to the gate 205, which then turns its output to high. The high output of the gate 205 is sent over the line 102 to the switching device 200, causing it to change the position. The switching device 200 has its contact of the new position receiving the second reference voltage $Vref_0$, causing the operational amplifier 120 to receive on its inputs the higher first reference voltage $Vstd$ and the lower second reference voltage $Vref_0$, and consequently the charges stored in the integrating capacitor C are discharged by a constant current ($Vstd-Vref_0$)/R. As discharging goes on, when the voltage 100 across the integrating capacitor C has become lower than the first reference voltage $Vstd$, the comparator 121 reverses its output to bring the switching device 201 to a closed state, which short-circuits the terminals of the integrating capacitor C and at the same time turns the output of the gate 202 to high. In response to the high output of the gate 202, it is indicated via the gate 203 to the flip-flop 204, which issues the data input command to the L-terminal of the latch 31, and the count result in the counter 30 is transferred to the latch 31.

The output of the counter 30 is also received by the gate 209, and if the output of the gate 202 does not go high until the gate 209 produces a high output in response to the output of the counter 30, i.e., if the integrating capacitor C takes an excessive time for discharging, the counter advances its contents to hex 1F0, causing the gate 209 to reverse its output to high, and the flip-flop 204 sends the data input command via the gate 203 to the L-terminal of the latch 31 and the count result in the counter 30 is transferred to the latch 31.

The output of the counter 30 is further received by the gate 212, and if the counter advances its contents to hex 7E, the gate 212 produces a high output, and the latches 32 provided in the A/D converters $AD_1-AD_8$, as will be described shortly, will operate to hold the 5-bit count result $b_1-b_5$ in the counter 30.

Next, the A/D converter $AD_1$ shown in FIG. 7B will be described. The circuit arrangement is basically the same as $AD_0$, but uses the $BV_0$ input as the reference of brightness in the view field and has additional components including a comparator 230 for comparing the input luminance value $BV_1$ in the first area with the reference input $BV_0$ to produce a resultant polarity signal, switching devices 221 and 222, a flip-flop 220, and a latch 32 for holding the contents of the counter 30.

The operation of the $AD_1$ is as follows. The comparator 230 compares the input luminance value $BV_1$ with the reference input $BV_0$ and, if $BV_0$ is larger than $BV_1$, produces a low output, which is received by the flip-flop 220 in the A/D converter $AD_1$. Upon receiving the negative edge of the A/D conversion start signal STR, which is issued by the A/D converter $AD_0$ in response to a low-state transition of the gate 205 within the $AD_0$ for timing the charging to the integrating capacitor, the flip-flop 220 transmits the low output of the comparator 230 to its output. Consequently, the switching devices 221 and 222 are set to the positions as shown. These operations are equivalent to the case of the $AD_0$, as described on FIG. 7A, with the previous signals $Vstd$ and $Vref_0$ being replaced with $BV_1$ and $Vref_1$, respectively, and $BV_0$ being used unchanged.

When the A/D conversion command signal ADCH issued by the A/D converter $AD_0$ goes low, the switching device 223 is set to the position as shown. The operational amplifier 122 receives the reference signal $BV_0$ and luminance signal $BV_1$ and provides the difference $BV_0-BV_1$ for the comparator 123, which compares the input with another input $BV_1$ and, if $BV_0$ is larger than $BV_1$, produces a low output. Consequently, the switching device 224 is set to the position as shown, causing the integrating capacitor C to start charging by the current ($BV_0-BV_1$)/R.

The counter 30 (shown in FIG. 7A) which is used commonly among the A/D converters $AD_0-AD_8$ has already started counting, and when the count reaches a certain value, the output of the gate 208 goes high and then the output of the gate 210 goes high, causing the ADCH signal to become high. In consequence, the switching device 223 makes a transition from the state shown, causing the operational amplifier 122 to receive on its inputs the $BV_1-Vref_1$, and the integrating capacitor C is discharged by the constant current $(BV_1-(B-V_1-Vref_1))/R$.

When the voltage 105 across the integrating capacitor C has fell below the input luminance input $BV_1$ by discharging, the comparator 123 reverses its output to bring the switching device 224 to a closed state, which short-circuits the terminals of the integrating capacitor and at the same time causes the gate 225 to reverse its output to a high state. The output of the gate 225 is fed via the gate 226 to the flip-flop 227, which then issues a data input command to the latch 32, and the contents of the counter 30 is latched.

Figure 8A:
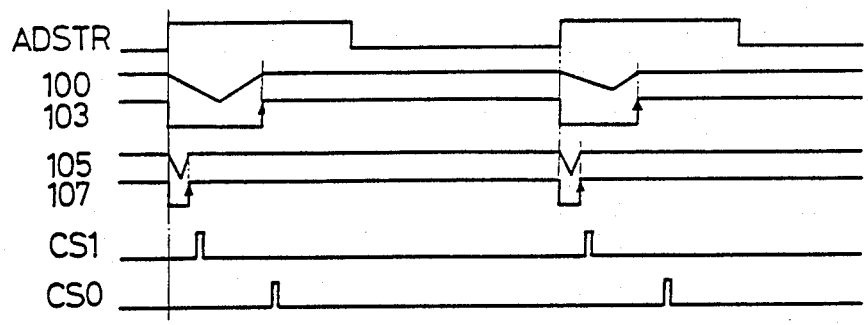
FIG. 8 is a timing chart used to explain the operation of the above A/D conversion circuit.
Figure 8B:
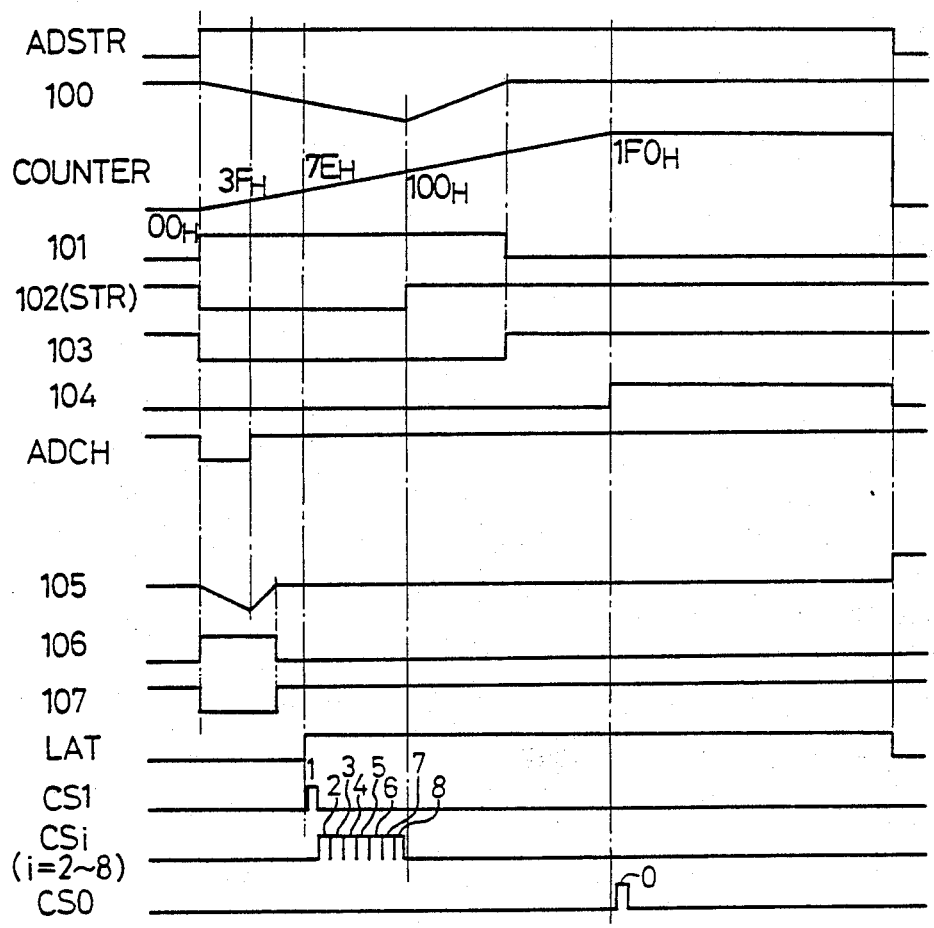

FIG. 8 is a set of timing charts used to explain the operation of the A/D converter, FIG. 8A showing the major signals observed in the iterative operation, FIG. 8B showing detailed signals within one cycle of the iterative operation in FIG. 8A. First, the operation of $AD_0$ will be described. When the A/D conversion start signal ADSTR from the CPU goes high, the integrating capacitor C starts charging and the terminal voltage 100 falls. The counter 30 starts counting, and halts when the count has reached hex 1F0. The comparator 121 has its output 101 staying high during charging and discharging of the capacitor C, and the charge/discharge switching gate 205 has its output (STR) being low only during the charging period of the capacitor and staying high in the reset of the cycle. The latch command signal 103 goes high at the end of discharging of the capacitor C. The gate 209 has its output 104 going high when the counter has advanced its count to hex 1F0.

Next, the operation of the $AD_1$ ($AD_2-AD_8$) will be described. In response to a high state of ADSTR, the integrating capacitor C starts charging and the terminal voltage 105 falls. The counter 30 operates to count, and when the count has reached hex 7E, the gate 212 in $AD_0$ produces a high output LAT, and the counter contents at this moment is held in the latch 32. The switching of charging and discharging for the integrating capacitor C takes place at a shorter timing than that set for the $AD_0$, i.e., controlled by the ADCH signal which is generated by the gate 208 when the counter contents has reached hex 3F.

The chip-select signal $CS_0$ is generated when the counter contents has reached hex 1F0, and the chip-select signals $CS_1-CS_8$ are generated successively after the counter contents has reached hex 7E.

Figure 9:
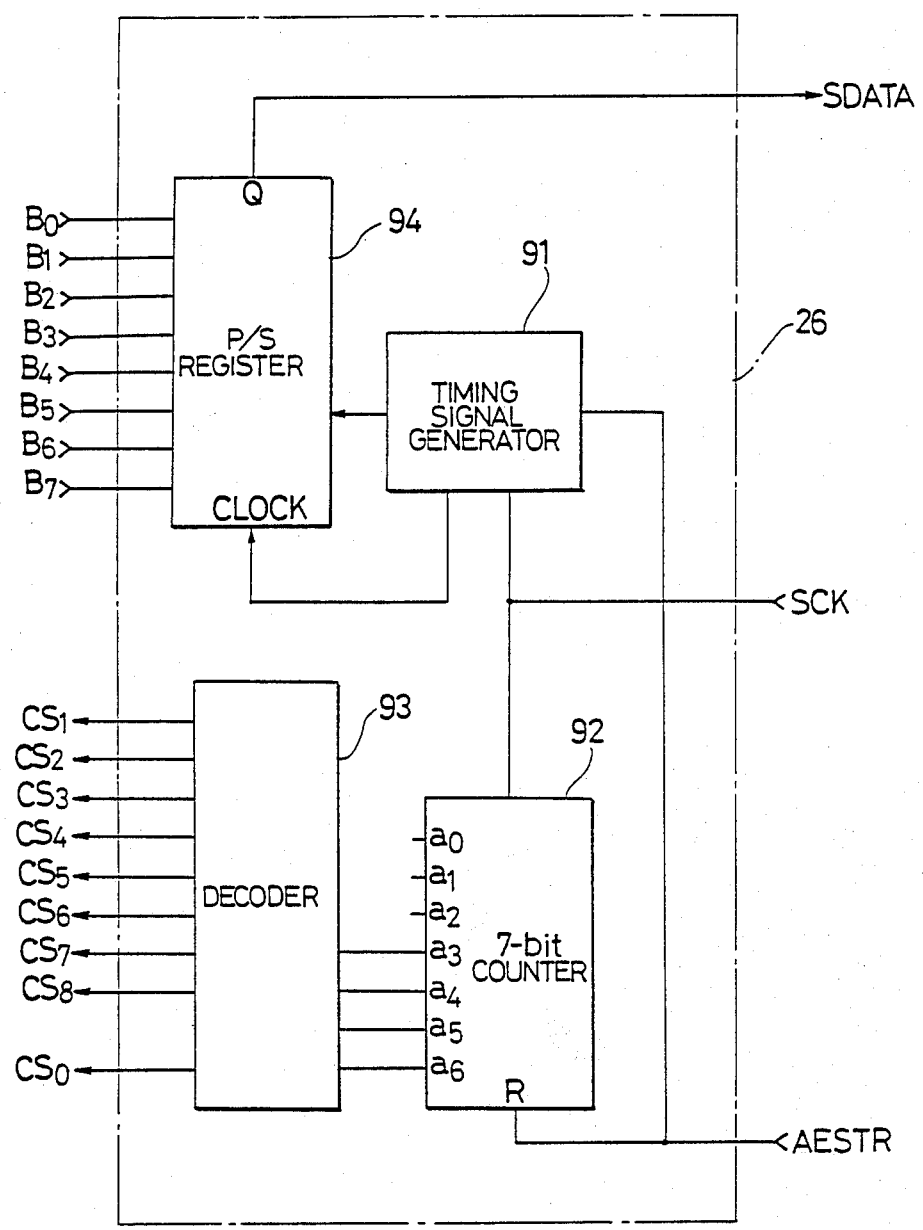
FIG. 9 is a block diagram showing the P/S conversion control circuit.
Figure 10:
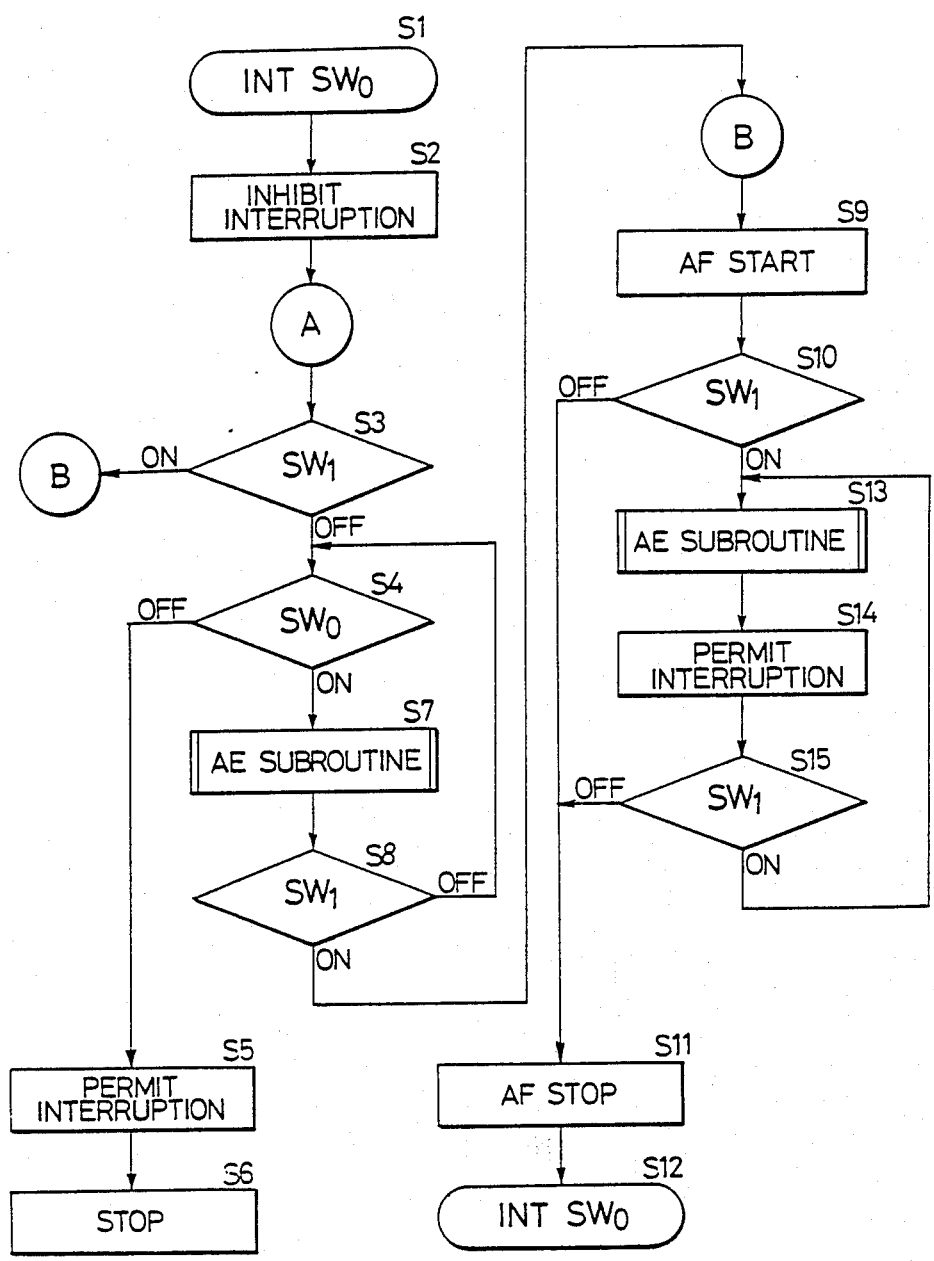

FIG. 9 shows in block diagram the circuit arrangement of the P/S controller 26 which operates to convert the 8-bit parallel signal from the A/D converter into a serial signal to be delivered to the CPU. The P/S controller 26 consists of a timing signal generator 91 which operates in response to the reference clock signal SCK and data read signal AESTR provided by the CPU, a 7-bit counter 92 which starts counting in response to the AE read signal AESTR, a decoder 93 which produces the chip-select signals $CS_0-CS_8$ sequentially in response to the specific values of the counter 92, and a P/S register 94 which converts a parallel signal into a serial signal.

In operation, the P/S controller 26 starts operating in response to the AE read signal. The 7-bit counter 92 counts clock pulses, and the decoder 93 decodes the count to produce the chip-select signals $CS_0-CS_8$ for selecting one of the A/D converters $AD_0-AD_8$ at one time. The selected A/D converter supplies an 8-bit luminance signal to the P/S register 94. The P/S register 94 is controlled by the timing signal and clock signal sent from the timing signal generator 91 to hold an 8-bit parallel signal, convert it into a serial signal, and send it to the CPU.

Next, the signal processing carried out in the CPU will be described with reference to the flowcharts in FIGS. 10 through 14. When the photometry switch $SW_0$ is closed, an interrupt signal shown in FIG. 4 is sent from the gate 23 to the CPU, and the interrupt process is commenced from "INT $S_0$" (step S1 in FIG. 10). After further interruption is inhibited (step S2), the sequence enters routine A and beginning from step S3 in which the state of the automatic focusing switch $SW_1$ is tested. If $SW_1$ is found closed, the sequence proceeds to routine B beginning from step S9. If $SW_1$ is found open, the routine confirms the state of the photometry switch $SW_0$ (step S4), and if it is found open, indicating an erroneous operation of the switch $SW_0$, the routine permits interruption and waits for a further closure of $SW_0$ (steps S5, S6). If the closure of $SW_0$ is confirmed in step S4, the sequence makes a jump to the AE subroutine which determines the exposure value (step S7). The AE subroutine will be described later.

Returning from the AE subroutine, the routine tests the state of the automatic focusing switch $SW_1$ (step S8), and if it is found open, the sequence returns to the step S4 for confirming whether switch $SW_0$ is still closed or not. If $SW_1$ is found closed in step S8, the sequence enters the routine B. Routine B begins with forwarding the AF start signal to the automatic focus detection circuit 14 (step S9). After that, a series of operations for the automatic focus adjustment and motor drive take place independently of the CPU process. After issuance of the AF start signal, the routine tests the state of the switch $SW_1$ (step S10), and if it is found open, the AF stop signal is issued to the automtic focus detection circuit 14 (step S11). The signal causes the circuit to halt the operations of focus detection and motor drive independently of the CPU process. Following the issuance of the AF stop signal, the sequence proceeds back to INT $SW_0$. If the switch $SW_1$ is found closed, the sequence makes a jump to the AE subroutine (step S13), and after a series of processes have ended, the routine permits interruption (step S14) and tests the state of $SW_1$ (step S15). If it is found open, the AF stop signal is issued (step S11), and the sequence proceeds back to INT $SW_0$, or if $SW_1$ is found closed in step S15, the sequence makes a jump again to the AE subroutine (step S13). After interruption is permitted, when the automatic focus detection circuit 14 issues the AF in-focus signal AFE to the gate 23, a negative edge signal of INT2 is sent from the gate 23 to the interrupt control circuit, and the sequence enters the INT AFE routine shown in FIG. 11.

In the INT AFE routine, interruption is inhibited (step S21), and the AF stop signal is issued to the automatic focus detection circuit 14 (step S22) so that the focus adjustment mechanism is made inoperative. Thereafter, the sequence jumps to the AE subroutine and, after a series of processes have ended (step S23), the routine tests the state of $SW_1$ (step S24). If $SW_1$ is found open, the sequence proceeds to the routine for testing the state of $SW_0$ (step S27), or if $SW_1$ is found closed, the routine tests the state of the release switch $SW_2$ (step S25). If $SW_2$ is found open, the sequence returns to the routine for testing the state of $SW_1$ (step S24). During the operation of waiting for the closing of SW$_2$ in the loop of steps S24 and S25, and if the AF switch SW$_1$ becomes open, the sequence enters the routine for testing the state of photometry switch SW$_0$ (step S27), instead of going to the operation of release. If the release switch SW$_2$ is found closed in step S25, the release operation starts for setting the shutter speed, diaphragm and the like, and the shutter is operated.

After that, the routine tests the state of the photometry switch SW$_0$ and, if it is found open, permits interruption and terminates the process (steps S28, S29). If SW$_0$ is found closed, the sequence jumps to the step S3 of routine A to carry out the routine again.

In the AE subroutine shown in FIG. 12, an operation command is issued to the automatic exposure value processing circuit 13 shown in FIGS. 4 and 5 and, after the measured luminance value is A/D converted, the luminance data is supplied to the CPU (step S31). Subsequently, the sequence jumps to the subroutine of divisional processing, which will be described later, to carry out the divisional photometric process (step S32), and the sequence returns from the subroutine accompanied by the optimal luminance data obtained as a result of process and then proceeds to the APEX calculation (step S34) in which luminance data obtained in step S32 and set data inputted in step S33 are processed. The calculation evaluates the shutter speed and diaphragm setting to be displayed, which are sent to the display circuit shown in FIG. 1 (step S35), and the sequence goes out of the AE subroutine to the original routine.

Next, the subroutine of divisional process will be described using FIGS. 13 and 14. This routine is intended to determine the exposure value from the luminance values of the divided areas in the view field. After luminance data of divided areas of the view field have been fetched (step S41), the routine tests the state of the photometry mode selector switch SW$_A$ which is operated in the exterior of the camera (step S42), and if it is found closed, the routine samples the luminance value BV$_0$ in the central area of the field for the optimal luminance value BVc to be used for the APEX calculation (step S43), and then returns to the original routine.

If the photometry mode selector switch SW$_A$ is found open, the sequence jumps to the $\Delta$BVmax$\sim$min routine (step S44), in which the maximum value $\Delta$BVmax of differences $\Delta$BVi between the luminance values BVi of the surrounding areas and that BV$_0$ of the central area, the second largest value $\Delta$BV$_A$, the minimum value $\Delta$BVmin, and the luminance width $\Delta$BVw are obtained. These values will be described later.

Following the process in the $\Delta$BVmax$\sim$min routine (step S44), the sequence goes again to the divisional process subroutine to test whether BV$_0$+$\Delta$BVmax is larger than 11.3 EV for the judgment of the maximum luminance (step S45), and, if this is not true, goes to the routine for testing whether $\Delta$BVmax is larger than 2.3 EV (step S48). If the test result of step S45 is true, the routine tests whether BV$_0$ is larger than 11.3 for the judgment of brightness in the central area of the field (step S46), and, if this is true, the sequence goes to the routine following the test of $\Delta$BVmax>2.3 (step S48), or if the test result of step S46 is false, the maximum value $\Delta$BVmax of the luminance difference obtained in the $\Delta$Bmax$\sim$min routine is abandoned and the second largest value $\Delta$BV$_A$ is adopted as a new maximum value of the luminance difference (step S47).

Next, the sequence proceeds to the routine beginning the test of $\Delta$BVmax>2.3 EV (step S48). In this routine, the luminance distribution in the view field such as is analized so as to obtain a luminance value BVc which finally determines the exposure control.

The function of steps S48 to S58 will be understood in accordance with the followings, wherein 5 EV compared with $\Delta$BVw in step S50 or S55 corresponds to the width of film latitude, and 2.3 EV or −2.7 EV appearing in steps such as step S48, S49 and S54 corresponds approximately to a half of the width of film latitude:

1. For $\Delta$BVmax>2.3 ("YES" at step S48)
   a. With $\Delta$BVmin<−2.7 ("YES" at step S54)

$$BVc = BV_0 \qquad (2)$$

b. For $\Delta$BVmin$\sqrt{}$ −2.7 ("NO" at step S54)
      (i) With $\Delta$BVw>5 ("YES" at step S55)

$$BVc = BV_0 + \Delta BVmin + 2.7 \qquad (5)$$

(ii) With $\Delta$BVw$\leq$5 ("NO" at step S55)

$$BVc = BV_0 + \Delta BVmax - 2.3 \qquad (6)$$

2. For $\Delta$BVmax$\leq$2.3 ("NO" at step S48)
   a. For $\Delta$BVmin<−2.7 ("YES" at step S49)
      (i) With $\Delta$BVw>5 ("YES" at step S50)

$$BVc = BV_0 + \Delta BVmax - 2.3 \qquad (3)$$

(ii) With $\Delta$BVw$\leq$5 ("NO" at step S50)

$$BVc = BV_0 + \Delta BVmin + 2.7 \qquad (4)$$

b. With $\Delta$BVmin$\geq$ −2.7 ("NO" at step S49)

$$BVc = BV_0 \qquad (1)$$

Figure 13:
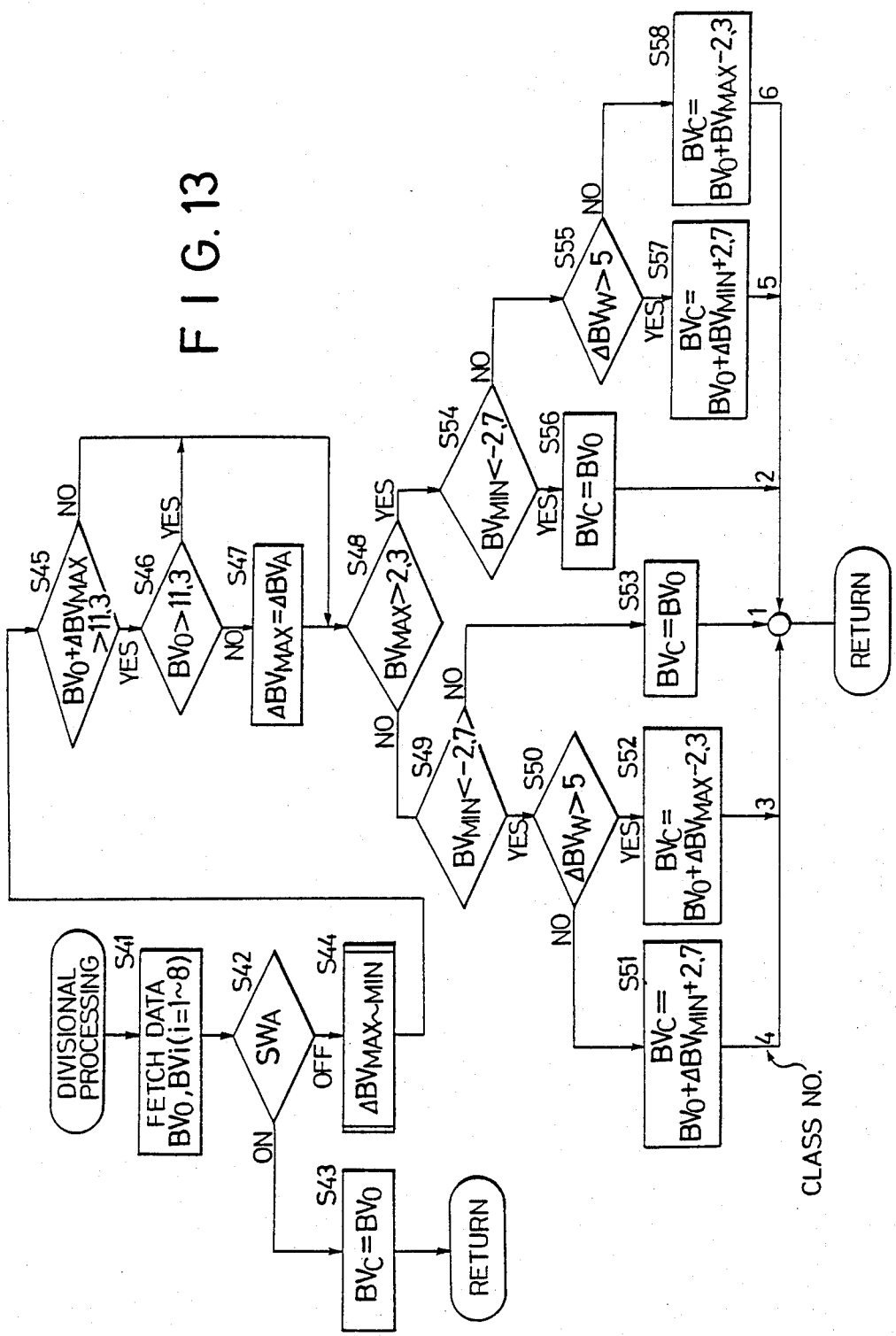
Figure 14:
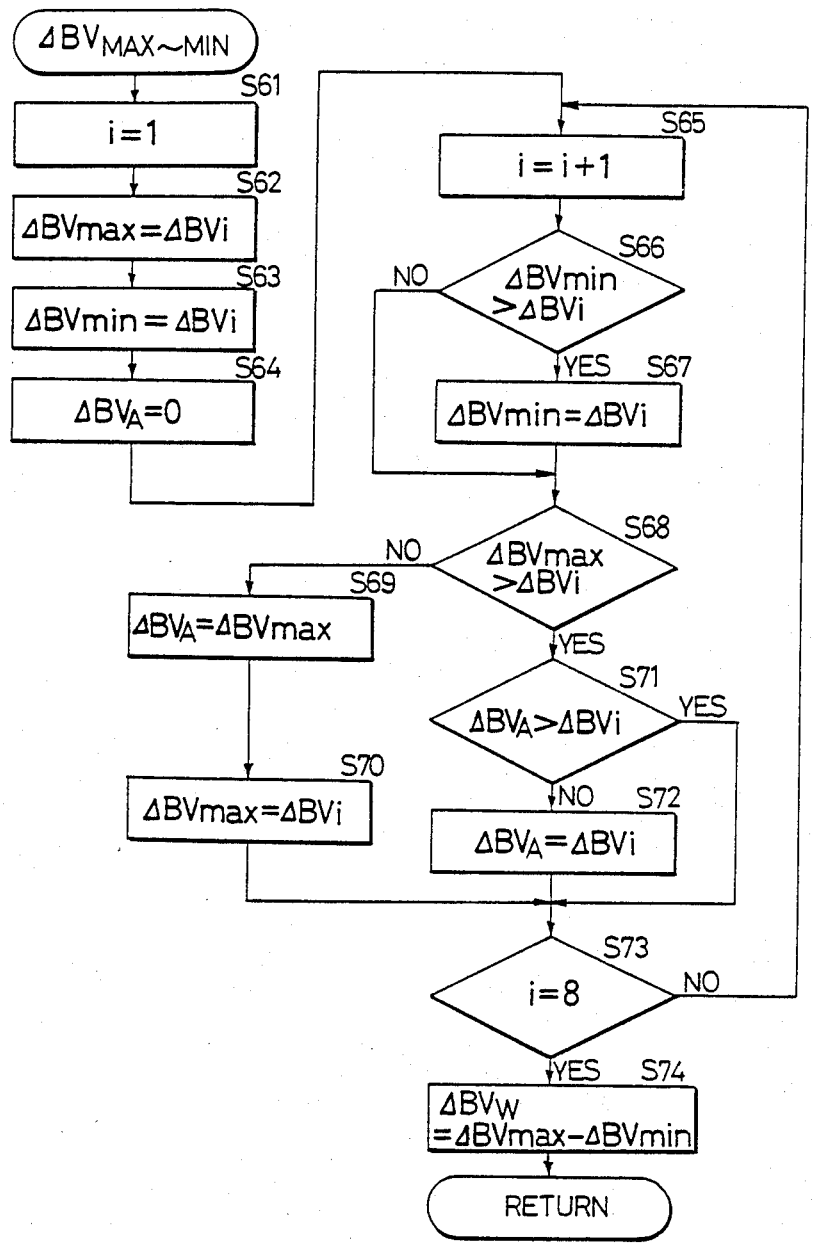

The numbers (1) through (6) appended to the above conditions correspond to the classification number shown at the bottom of the flowchart in FIG. 13.

The means for determining BVc described above is generally summarized in terms of three kinds of BVc, i.e., I. $BVc = BV_0$
II. $BVc = BVmax - E_1$
III. $BVc = BVmin + E_2$ wherein $BVmax = BV_0 + \Delta BVmax$,
$BVmin = BV_0 + \Delta BVmin$,
$E_1$ represents a half of film latitude on a greater exposure side; and $E_2$ represents another half of film latitude on a less exposure side.

The following shows how to select one of the three kinds of BVc:

1. For $BVmax - BV_0 > E_1$ and $BVmin - BV_0 < -E_2$, or $BVmax - BV_0 \leq E_1$, and $BVmin - BV_0 \geq -E_2$: $BVc = BV_0$
2. For $BVmax - BV_0 > E_1$ and $BVmin - BV_0 \geq -E_2$ and $BVmax - BVmin \leq E_1 + E_2$, or $BVmax - BV_0 \leq E_1$ and $BVmin - BV_0 < -E_2$ and $BVmax - BVmin > E_1 + E_2$: $BVc = BVmax - E_1$
3. For $BVmax - BV_0 > E_1$ and $Bvmin - BV_0 \geq -E_2$ and $BVmax - BVmin > E_1 + E_2$, or $BVmax - BV_0 \leq E_1$ and $BVmin - BV_0 < -E_2$ and $BVmax - BVmin \leq E_1 + E_2$: $BVc = BVmin + E_2$ FIG. 15 shows examples of process result for determining the luminance value. In the figure, the luminance value is plotted on the vertical axis for a series of examples expanded on the horizontal axis. The leftmost case is of conditions $\Delta BVmax \leq 2.3$ and $\Delta BVmin \geq -2.7$, indicating that $BV_0$ is adopted as $BVc$. The classification number is "1". The fourth example from the right is the case of conditions $\Delta BVmax > 2.3$ and $\Delta BVmin \geq -2.7$ and at the same time the luminance width $\Delta BVw > 5$, indicating that $BV_0 + \Delta BVmin + 2.7$ is adopted as $BVc$. The classification number is "5".

The number at the lower end of each vertical line in FIG. 15 indicates the difference between $BVmax$ and $Bvmin$, in which "<5" means that the difference is "smaller than 5EV", "=5" means "equal to 5EV", and ">5" means "larger than 5EV".

Finally, the subroutine of $\Delta BVmax \sim min$ in FIG. 14 will be described. This subroutine is to obtain the maximum value $\Delta BVmax$, the second largest value $BVA$, the minimum value $\Delta BVmin$, and the luminance width $\Delta BVw$. In the example given here, the view field is divided into nine areas and data processing are executed in 8 areas except center area, then the parameter i takes 1 through 8.

In step S61, the initial values of parameter set as $i=1$, and set $\Delta BVmax = \Delta BVi$, $\Delta BVmin = \Delta BVi$, $\Delta BV_A = 0$ (steps S62, S63, S64). In next step, i is incremented to $i+1$ (step S65). Next is to obtain $\Delta BVmin$, and in this case, $\Delta BVmin > \Delta BVi$ is tested (step S66), and if this is true, $\Delta BVi$ is stored as $\Delta BVmin$ (step S67). If the above test result is false, the sequence proceeds to step S68. Next is to obtain the $\Delta BVmax$, and in this case $\Delta BVmax > \Delta BVi$ is tested (step S68) and if this is false, $\Delta BVmax$ is stored as $\Delta BV_A$ (step S69) and $\Delta BVi$ is stored as $\Delta BVmax$ (step S70). If the above test result is true, the second largest difference $\Delta BV_A$ is obtained, and in this case $\Delta BV_A > \Delta BVi$ is tested (step S71) and if this is true, the sequence proceeds. If the above test result is false, $\Delta BVi$ is stored as $\Delta BV_A$ (step S72).

In the nesting dicision step, the sequence returns to the part of obtaining $\Delta BVmin$ while i is smaller than 8 (step S73), and when i has reached 8, i.e., process for all divided areas completes, the sequence goes out of nesting and the difference $\Delta BVw$ between the previously obtained $\Delta BVmax$ and $\Delta BVmin$ is calculated (step S74). The sequence goes out of the subroutine and returns to the original routine.

According to the inventive multi-point photometric apparatus, as described above, the luminance value is measured in each of divided areas of an objective field, and an expedient exposure value is determined on the basis of the luminance distribution which is recognized in relation between the reference luminance value for the central area, on which the automatic focus adjustment is carried out, and the luminance values for the other surrounding areas. Accordingly, through the operation of automatic focus adjustment by the operator, the luminance value of the central objective area is naturally adopted as the reference value, which effectively avoids a lacking or excessive exposure in that part of the field and at the same time the exposure value in consideration of the luminance distribution in the entire field is determined.

In the process of recognizing the luminance distribution in the objective field, since the reference value and the differences of values from the reference value are treated instead of other values as they are, the smaller magnitude of information under process allows fast signal processing, whereby it becomes possible to determine a proper exposure value when shooting continuously a moving object with varying brightness.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A multi-point photometric apparatus for measuring the luminance of an objective field comprising:

means for measuring the luminance of a plurality of divided areas of an objective field to produce a plurality of luminance signals in correspondence to said areas;

means for performing an automatic focus adjustment for a specific area among said divided areas;

means for selecting a reference luminance signal corresponding to said specific area at the completion of automatic focus adjustment;

means for recognizing a luminance distribution in the objective field basing on said selected reference luminance signal and a plurality of luminance signals corresponding to the plurality of areas other than said specific area, said reference luminance signal being the reference of said distribution; and means for producing exposure information in accordance with said luminance distribution.

2. A multi-point photometric apparatus according to claim 1, wherein said recognizing means includes means for eliminating any of said luminance signals in excess of a certain threshold value in recognizing a luminance distribution in the objective field.

3. A camera incorporating a multi-point photometric apparatus comprising:

means for measuring luminance of a plurality of divided areas in an objective field to produce a plurality of luminance signals in correspondence to said areas;

means for automatically adjusting a focusing condition of an objective lens of a camera to produce an in-focus signal when the objective lens is adjusted to an in-focus condition;

means for calculating exposure information on the basis of the plurality of luminance signals;

means for controlling the calculating means so that the calculating means repeatedly calculates the exposure information before the production of the in-focus signal, and so that the calculating means calculates the exposure information after the production of the in-focus signal;

means for indicating a display based on the exposure information;

means for storing the exposure information produced by the calculating means after the production of the in-focus signal;

means, after the production of the in-focus signal, for prohibiting the focusing condition adjusting means from shifting the objective lens and for permitting starting of an exposure operation of the camera; and means for controlling the exposure operation of the camera in accordance with the exposure information stored in the storing means.

4. A camera according to claim 3, further comprising means for interrupting the operation of the calculating means in accordance with a manual operation and for outputting the exposure information based on a specific luminance signal indicative of luminance of a center area in an objective field.

5. A camera incorporating a multi-point photometric apparatus comprising;
   means for measuring luminance of a plurality of divided areas in an objective field to produce a plurality of luminance signals in correspondence to said areas;
   means for detecting a focusing condition of an objective lens of the camera and for shifting the objective lens to an in-focus position on the basis of the detected focusing condition;
   means for calculating exposure information on the basis of the plurality of luminance signals;
   means for storing the exposure information when the objective lens is shifted to the in-focus position;
   means for indicating a display based on the exposure information;
   means, after the objective lens has been shifted to the in-focus position, for prohibiting the detecting and shifting means from shifting the objective lens and for permitting the starting of an exposure operation of the camera; and
   means for controlling the exposure information of the camera in accordance with the exposure information stored in the storing means.

6. A camera according to claim 5, further comprising means for interrupting the operation of the calculating means in accordance with a manual operation and for outputting the exposure information based on a specific luminance signal indicative of luminance of a center area in an objective field.

* * * * *